Aug. 26, 1958     S. R. STENSTROM     2,849,227
BRAKING DEVICE FOR PRINTING PRESSES
WITH RECIPROCATING TYPE BED
Filed Oct. 18, 1955
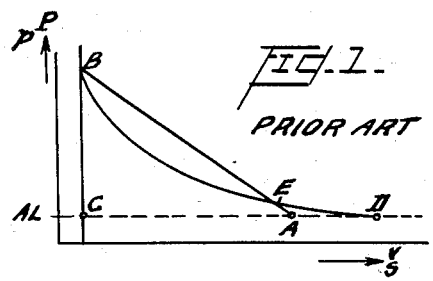
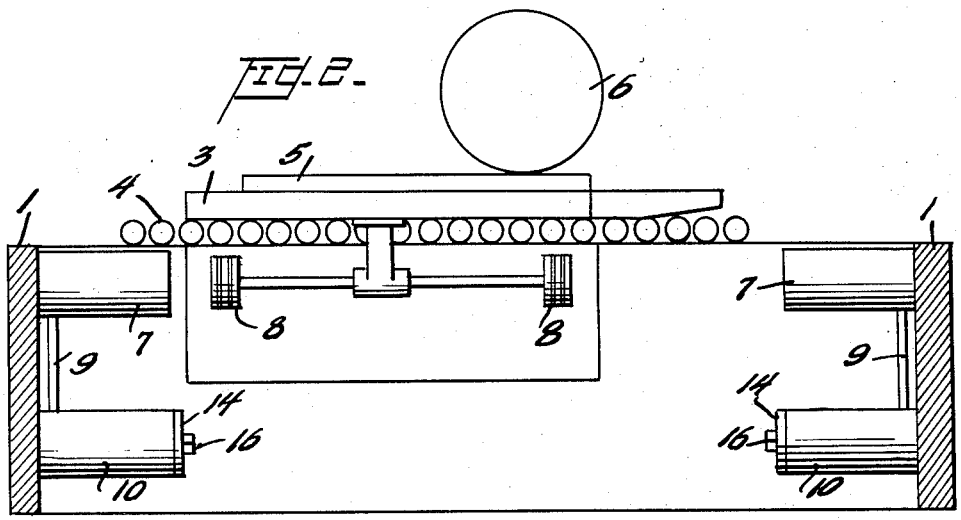
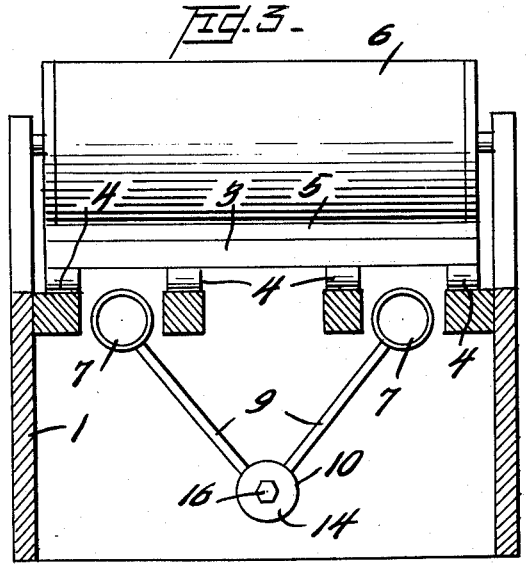
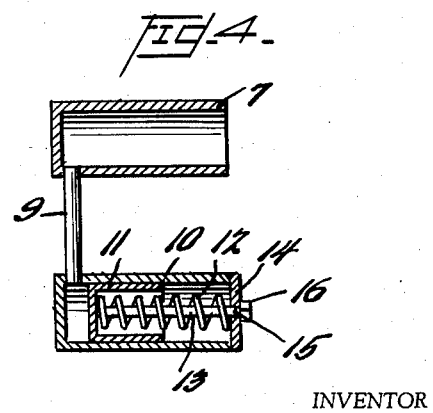
INVENTOR
Sven R. Stenstrom,
BY Sommers & Young
ATTORNEYS United States Patent Office 2,849,227
Patented Aug. 26, 1958

2,849,227

BRAKING DEVICE FOR PRINTING PRESSES WITH RECIPROCATING TYPE BED

Sten Richard Stenstrom, Trollhattan, Sweden

Application October 18, 1955, Serial No. 541,247

1 Claim. (Cl. 267—75)

This invention relates to a braking device for printing presses of the kind which employ a reciprocating type-bed and is characterized in that one or more brake cylinders are provided at the ends of the press, each cylinder having a compression chamber which is connected by means of a piping with a counter cylinder, in which a spring-loaded counter-piston is arranged so as to be movable by action of the compression pressure in the brake cylinder.

An object of this invention is to provide a mechanism of this kind having at a maintained value of final pressure, a braking force curve which agrees better than heretofore with the retardation force curve in such cases, where braking is effected by one or several cylinders, into which are placed braking pistons attached to the object, the motion of which is to be braked.

Another object of this invention is to provide a braking and regulating apparatus having a compression chamber and a counter-cylinder having a piston provided with a yieldable opening having such properties that the same final pressure is obtained, of course, as before; but the braking force curve will become more flat and more closely follow the curve of retardation force.

An exemplary embodiment of the invention is represented in the accompanying drawing.

In the drawings, Fig. 1 is a diagram graphically representing the connection between the power given off by the type-bed and the power taken up by the brake cylinder at various points of a retarding motion.

Figure 2 is a diagrammatic view of a printing press provided with a reciprocating type-bed and equipped with a braking device according to the present invention.

Figure 3 is a diagrammatic end view of the press according to the present invention, showing the brake cylinder or cylinders and the counter-cylinder and a piping arranged therebetween.

Figure 4 is a cross-sectional view of the braking and regulating mechanism represented as being detached from the press.

In printing presses of the kind provided with a reciprocating type-bed, the bed carries the printing medium, for instance, the type, and, in each cycle of operation, performs movements, as follows: printing stroke, during which the type-bed moves at constant speed; retardation and acceleration stroke, during which the type-bed is braked and reversed and again is set in motion, but in a direction opposite to that prevailing during the printing stroke; return stroke at constant speed; retardation, and acceleration stroke in the initial direction. At the end of this latter acceleration stroke a complete cycle of operation has been performed.

When using plain brake cylinders for taking up the mass forces met with during reciprocating motion of the type bed, it is found that the turning motion, provided that turning is caused by a rotary motion, is harmonic, that is, the retardation, and consequently the corresponding force varies in a linear manner with the speed of travel, whereas, a curve representing the force-travel of the braking cylinder becomes similar to hyperbola. If this motion is visualized graphically, the two curves do not agree very well, as will be seen from Fig. 1, where both curves have been drawn in a volume-pressure diagram.

Curve AB represents the variation of force P, given off by the type-bed, with travel $s$, if the motion is assumed to take place from right to left. Curve DEB represents the variation of specific air pressure $p$ and thus also the variation of buffer force P with the stroke volume $v$ and stroke $s$.

For practical reasons, starting point D is placed before the beginning of braking at point A. The final points for both curves coincide at B. The areas enclosed by Figures ABCD and DEBCD, representing the work given off by the type-bed and taken up by the buffer piston respectively should be of equal size.

From Figure 1 it will be apparent that during part DE there is a certain over-compensation, whereas there is under compensation during EB. The difference in P-values between the two curves represents the force acting upon the driving means, for instance, in the case of a driving mechanism with so-called frame shuttle wheels on crank and frame. This difference should be made as small as possible.

According to the present invention, as will be seen from Figure 2, a type-bed 3 is arranged on top of the press stand or frame 1 so as to be movable on roller links 4. Numeral 5 designates the form or type attached to the type-bed, and 6 designates the impression cylinder of the press. At both ends the press stand is equipped with one or more brake cylinders 7, into which braking pistons 8, arranged below and mounted on the type bed, enter when braking of the type-bed is to take place. The stroke of the braking piston and the length of the brake cylinder can, of course, vary in each special case, depending upon the final pressure desired.

From a brake cylinder 7, there is a connecting piping 9 providing communication with a counter-cylinder 10, which suitably can be connected with only one brake cylinder or can be connected with two or more braking cylinders arranged at the same end of the stand. In the counter-cylinder 10 a piston 11 is movable against the action of spring 12. Piston 11 is provided with an axially extending rod 13 which extends through the end wall 14 of the cylinder 10 at the opposite end of said cylinder from the face of piston 11, and the free end 15 of said rod is provided with an enlargement 16 which engages the wall 14 and limits movement of piston 11 to the left, in Fig. 4.

When the braking piston enters the brake cylinder and moves toward its bottom, normally the hyperbola-like curve shown in Fig. 1 should be obtained. Owing to the counter-cylinder, the pressure in the braking cylinder will be kept lower than normal, and the hyperbola-like curve will be flattened. By varying the cylinder volume and the spring force, the shape of the curve can be varied within very wide limits. But by obtaining a curve which in a desired manner agrees with the curve corresponding to the turning motion it is possible to attain by the present invention a uniform and smooth running of the press which has not heretofore been attained.

I claim:

In combination with a printing press having a reciprocating type-bed, braking apparatus comprising a brake cylinder mounted on the press frame and having an open end, a brake piston mounted on said type-bed to reciprocate therewith, and in position to enter said brake cylinder to perform a braking operation by the compression of air in said cylinder, a closed counter cylinder also mounted on said press frame, a conduit means having connections with said brake cylinder with said counter cylinder for the transfer of air therebetween, a second piston slidably mounted in said counter cylinder having one face toward said conduit connection with said counter cylinder, and a yieldable spring in said counter cylinder acting against the other face of said second piston tending to oppose movement of said second piston under the influence of air supplied to said counter cylinder through said conduit, thereby affecting the pressure in and the braking effect of said braking cylinder.

References Cited in the file of this patent

UNITED STATES PATENTS

| | | |
|---|---|---|
| 788,931 | McCain | May 2, 1906 |
| 836,268 | Miehle | Nov. 20, 1906 |
| 1,898,694 | Sikorsky | Feb. 21, 1933 |

FOREIGN PATENTS

| | | |
|---|---|---|
| 308,904 | Switzerland | Oct. 17, 1955 |